US011012730B2

(12) United States Patent
Regis et al.

(10) Patent No.: US 11,012,730 B2
(45) Date of Patent: May 18, 2021

(54) METHOD AND SYSTEM FOR AUTOMATICALLY UPDATING VIDEO CONTENT

(71) Applicant: Wipro Limited, Bangalore (IN)

(72) Inventors: Raymond Dixon John Francis Regis, Chennai (IN); Aditi Dey, Karnataka (IN)

(73) Assignee: Wipro Limited, Bangalore (IN)

(*) Notice: Subject to any disclaimer, the term of this patent is extended or adjusted under 35 U.S.C. 154(b) by 90 days.

(21) Appl. No.: 16/370,173

(22) Filed: Mar. 29, 2019

(65) Prior Publication Data

US 2020/0314476 A1     Oct. 1, 2020

(30) Foreign Application Priority Data

Mar. 29, 2019   (IN) .............................. 201941012377

(51) Int. Cl.
*H04N 21/262*     (2011.01)
*H04N 21/845*     (2011.01)
(Continued)

(52) U.S. Cl.
CPC ... *H04N 21/26291* (2013.01); *H04N 21/8455* (2013.01); *H04N 21/8547* (2013.01); *H04N 21/8586* (2013.01)

(58) Field of Classification Search
None
See application file for complete search history.

(56) References Cited

U.S. PATENT DOCUMENTS 6,192,360 B1    2/2001  Dumais et al.
10,056,078 B1*  8/2018  Shepherd ........... G06Q 20/3272
(Continued)

FOREIGN PATENT DOCUMENTS

CN          107545210 A       1/2018

OTHER PUBLICATIONS

Priyadarshini, P., et al., "Document Based Semantic CMS in Cloud", Information Technology Journal, 13: 217-230, published Feb. 7, 2014 (13 pages).

(Continued)

*Primary Examiner* — Jason K Lin
(74) *Attorney, Agent, or Firm* — Finnegan, Henderson, Farabow, Garrett & Dunner, LLP

(57) ABSTRACT

A method and a system for automatically updating video content are disclosed. In an embodiment, the method may include identifying a frame within a video content based on a plurality of timestamps assigned within the video content, wherein the frame is required to be updated. The method may further include extracting content information associated with the frame, and retrieving at least one source hyperlink used within the frame, based on the content information. The method may further include comparing a first textual content derived from the content information and a second textual content derived from at least one webpage associated with the at least one source hyperlink. The method may further include updating the frame with a summarized text associated with the second textual content and an audio content generated for the summarized text, based on the comparing, and merging the updated frame with the video content.

17 Claims, 7 Drawing Sheets

(51) Int. Cl.
*H04N 21/858* (2011.01)
*H04N 21/8547* (2011.01)

(56) References Cited

U.S. PATENT DOCUMENTS

| | | | |
|---|---|---|---|
| 2008/0235565 A1* | 9/2008 | Ackerman | G06F 40/134 |
| | | | 715/205 |
| 2015/0139618 A1* | 5/2015 | Chakra | H04N 21/252 |
| | | | 386/287 |
| 2017/0017861 A1* | 1/2017 | Patil | H04N 21/251 |
| 2017/0039450 A1* | 2/2017 | Zhou | G06F 16/532 |
| 2019/0313163 A1* | 10/2019 | Shen | H04N 21/21805 |
| 2020/0068243 A1* | 2/2020 | Hardee | H04N 21/8405 |
| 2020/0213680 A1* | 7/2020 | Ingel | G10L 13/086 |

OTHER PUBLICATIONS

Yang, H., et al., "Content Based Lecture Video Retrieval Using Speech and Video Text Information", IEEE Transactions on Learning Technologies, vol. 7, No. 2, Apr.-Jun. 2014, pp. 142-154.

\* cited by examiner

METHOD AND SYSTEM FOR AUTOMATICALLY UPDATING VIDEO CONTENT

TECHNICAL FIELD

This disclosure relates generally to updating content, and more particularly to a method and a system for automatically updating video content.

BACKGROUND

Video content sharing platforms, such as online tutorial platforms may offer video content, so as to provide users the facility of self-learning. Examples of such platform include Udemy™ and Edureka™. Video content for such video content sharing platforms may be prepared or contributed by content creators using various references from different sources. The content creators may include authors, instructors, and tutors.

These online tutorial platforms may provide the content creator a two-phase platform interaction. In one phase, the content creator after having created video content in an offline mode, may upload the video content on the online tutorial platforms. In the other phase, the content creator may be required to update the video content, for example, after the video content has become obsolete, or when the video content requires making a correction. The correction may include changes like adding an extra picture of a lecture slideshow, adding an additional mathematical formula from an academic journal, etc. Accordingly, the content creator is required to periodically perform validation of the existing video content, so as to check whether any updates are required, and take necessary action to update the video content.

The online tutorial content may include multiple slides. The slides may further include information sourced from one or more sources, such as webpages. The slides may also include details of these sources, such as hyperlinks associated with the webpages. Whenever there is any change in the original content of the respective source, the same changes have to be reflected in the video content.

Some techniques for updating the video content are known. These techniques may involve taking down the video content completely, followed by manually making changes to the video content, so as to create updated video content. The updated video content may then be uploaded on the online tutorial platform. It is observed that the process of updating is a time-consuming process. Further, during the time the video content is being updated, the video content suffers a downtime, as the video content is not available to the users. Such downtime may cause inconvenience to the users, especially when the users are in the middle of accessing the online tutorial content.

SUMMARY

In one embodiment, a method for automatically updating video content is disclosed. The method may include identifying a frame within a video content based on a plurality of timestamps assigned within the video content, wherein the frame is required to be updated. The method may further include extracting content information associated with the frame. The method may further include retrieving at least one source hyperlink used within the frame, based on the content information. The method may further include comparing a first textual content derived from the content information and a second textual content derived from at least one webpage associated with the at least one source hyperlink. The method may further include updating the frame with a summarized text associated with the second textual content and an audio content generated for the summarized text, based on the comparing. The method may further include merging the updated frame with the video content to generate an updated video content.

In another embodiment, an updating device for automatically updating video content is disclosed. The updating device includes a processor and a memory communicatively coupled to the processor. The memory stores processor instructions, which, on execution, cause the processor to identify a frame within a video content based on a plurality of timestamps assigned within the video content, wherein the frame is required to be updated. The processor instructions, on execution, may further cause the processor to extract content information associated with the frame. The processor instructions, on execution, may further cause the processor to retrieve at least one source hyperlink used within the frame, based on the content information. The processor instructions, on execution, may further cause the processor to compare a first textual content derived from the content information and a second textual content derived from at least one webpage associated with the at least one source hyperlink. The processor instructions, on execution, may further cause the processor to update the frame with a summarized text associated with the second textual content and an audio content generated for the summarized text, based on the comparing, and merge the updated frame with the video content to generate an updated video content.

In yet another embodiment, a non-transitory computer-readable storage medium is disclosed. The non-transitory computer-readable storage medium has stored thereon, a set of computer-executable instructions causing a computer comprising one or more processors to perform steps including identifying a frame within a video content based on a plurality of timestamps assigned within the video content, extracting content information associated with the frame, retrieve at least one source hyperlink used within the frame, based on the content information, comparing a first textual content derived from the content information and a second textual content derived from at least one webpage associated with the at least one source hyperlink, updating the frame with a summarized text associated with the second textual content and an audio content generated for the summarized text, based on the comparing, and merging the updated frame with the video content to generate an updated video content.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

Figure 1:
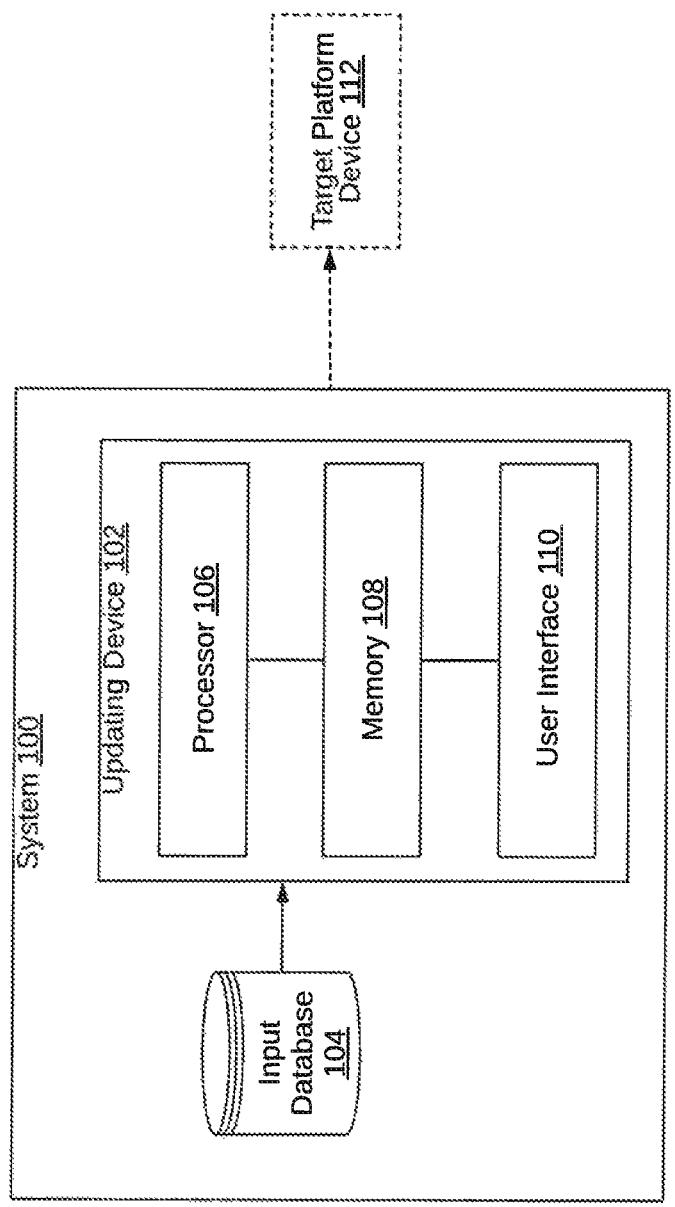
FIG. 1 is a block diagram illustrating a system for updating video content, in accordance with an embodiment.

In one embodiment, a system 100 for automatically updating video content is illustrated in the FIG. 1, in accordance with an embodiment. The system 100 may include an updating device 102 and an input database 104. The updating device 102 may be a computing device having voice processing capability. Examples of the updating device 102 may include, but are not limited to, server, desktop, laptop, notebook, netbook, tablet, smartphone, mobile phone, application server, sever, or the like.

The updating device 102 may automatically update video content on a target platform device 112. By way of an example, the updating device 102 may update the tutorial video content on an online tutorial platform, when there is a change in one or more source contents which are used to create the tutorial video content. To this end, the updating device 102 may be communicatively coupled to a target platform device 112 at which the video content is to be updated. It may be understood that the target platform may include a mobile Application or a website. The updating device 102 may receive input data, for example, audio sample of a content creator and training data from the input database 104. To this end, the updating device 102 may be communicatively coupled to the input database 104.

As will be described in greater detail in conjunction with FIG. 2 to FIG. 6, in order to automatically update the video content, the updating device 102 may identify a frame (required to be updated) within the video content based on a plurality of timestamps assigned within the video content. The updating device 102 may further extract content information associated with the frame. The updating device 102 may further retrieve at least one source hyperlink used within the frame, based on the content information. The updating device 102 may further compare a first textual content derived from the content information and a second textual content derived from at least one webpage associated with the at least one source hyperlink. The updating device 102 may further update the frame with a summarized text associated with the second textual content and an audio content generated for the summarized text, based on the comparing. The updating device 102 may further merge the updated frame with the video content to generate an updated video content.

In order to perform the above discussed functionalities, the updating device 102 may include a processor 106 and a memory 108. The memory 108 may store instructions that, when executed by the processor 106, cause the processor 106 to automatically update video content, as discussed in greater detail in FIG. 2 to FIG. 6. The memory 108 may be a non-volatile memory or a volatile memory. Examples of non-volatile memory, may include, but are not limited to a flash memory, a Read Only Memory (ROM), a Programmable ROM (PROM), Erasable PROM (EPROM), and Electrically EPROM (EEPROM) memory. Examples of volatile memory may include, but are not limited to Dynamic Random Access Memory (DRAM), and Static Random-Access memory (SRAM). The memory 108 may also store various data (e.g., video content data, input data, audio data, audio sample data, text data, neural network, feature data, threshold data, training data, hyperlink data, webpage data, etc.) that may be captured, processed, and/or required by the system 100.

The updating device 102 may further include a user interface 110 through which the updating device 102 may interact with a user and vice versa. By way of an example, the user interface 110 may be used to display the video content and various frames constituting the video content. The user interface 110 may further allow a user to tag the frames with timestamps.

The system 100 may interact with one or more external devices (not shown in FIG. 1) over a communication network (not shown in FIG. 1) for sending or receiving various data. Examples of the one or more external devices may include, but are not limited to a remote server, a digital device, or another computing system. The communication network may be a wired or a wireless network and the examples may include, but are not limited to the Internet, Wireless Local Area Network (WLAN), Wi-Fi, Long Term Evolution (LTE), Worldwide Interoperability for Microwave Access (WiMAX), and General Packet Radio Service (CPRS).

Figure 2:
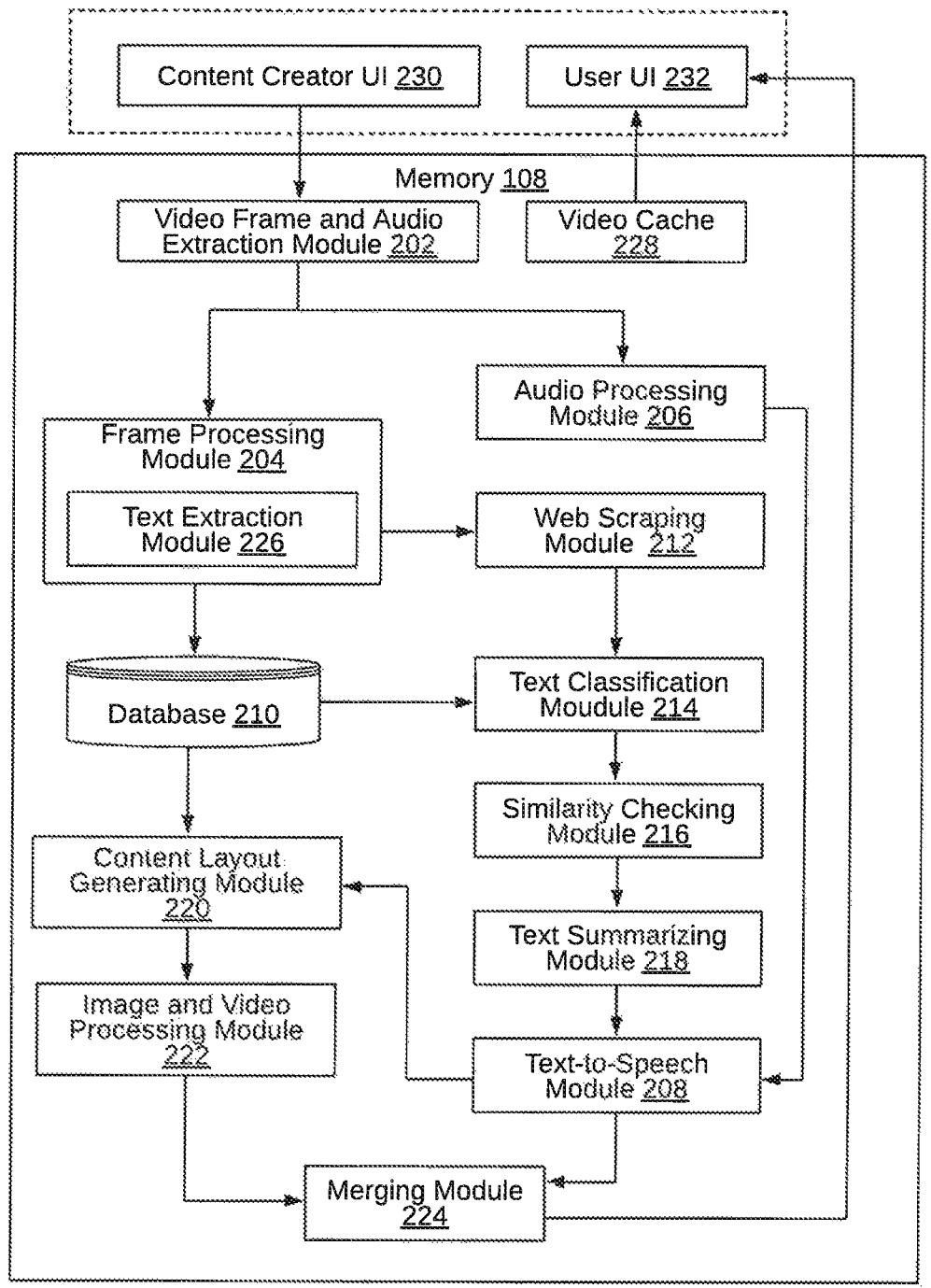
FIG. 2 illustrates a block diagram of a memory of an updating device for updating video content, in accordance with an embodiment.

Referring now to FIG. 2, a functional block diagram of the memory 108 within the updating device 102 configured to automatically update video content is illustrated, in accordance with an embodiment. The memory 108 may include modules that may perform various functions so as to automatically update the video content. The memory 108 may include an video frame and audio extraction module 202, a frame processing module 204, an audio processing module 206, a text-to-speech (TTS) module 208, a database 210, a web scraping module 212, a text classification module 214, a similarity checking module 216, a text summarization module 218, a content layout generating module 220, an image and video processing module 222, and a merging module 224. The memory may further include a video cache 228 that may store an uploaded video content. The video cache 228 may allow a user to access the video content even when the video content is being updated. As will be appreciated by those skilled in the art, all such aforementioned modules and databases 202-224 may be represented as a single module or a combination of different modules. Moreover, as will be appreciated by those skilled in the art, each of the modules and databases 202-224 may reside, in whole or in parts, on one device or multiple devices in communication with each other.

The video frame and audio extraction module 202 may receive video content. It may be noted that the video content may be built using one or more slides with bullet points. The video content may include a plurality of frames. The video content may be received from a content creator, via a content creator user interface (UI) 230. The content creator UI 230 is further explained in detail in conjunction with FIG. 3.

The user may automatically update an existing video content (for example, online tutorial video content) periodically, or as triggered by the changes in source content, using the content creator UI 230. The content creator UI 230 may allow tagging each of the plurality of frames that need an update. Each of the plurality of frames may be tagged with timestamps. Accordingly, only the tagged frames may be updated, and no processing may be performed for the remaining frames. In some embodiments, the plurality of frames may be tagged based on textual content in the video content. Further, an audio sample of the content creator may be received from the content creator, via the content creator UI 230. It may be noted that the audio sample may be required for obtaining a speech pattern of the content creator. As it will be explained later, using the speech pattern of the content creator, an audio content for providing explanation for updated frames may be generated.

Figure 4:
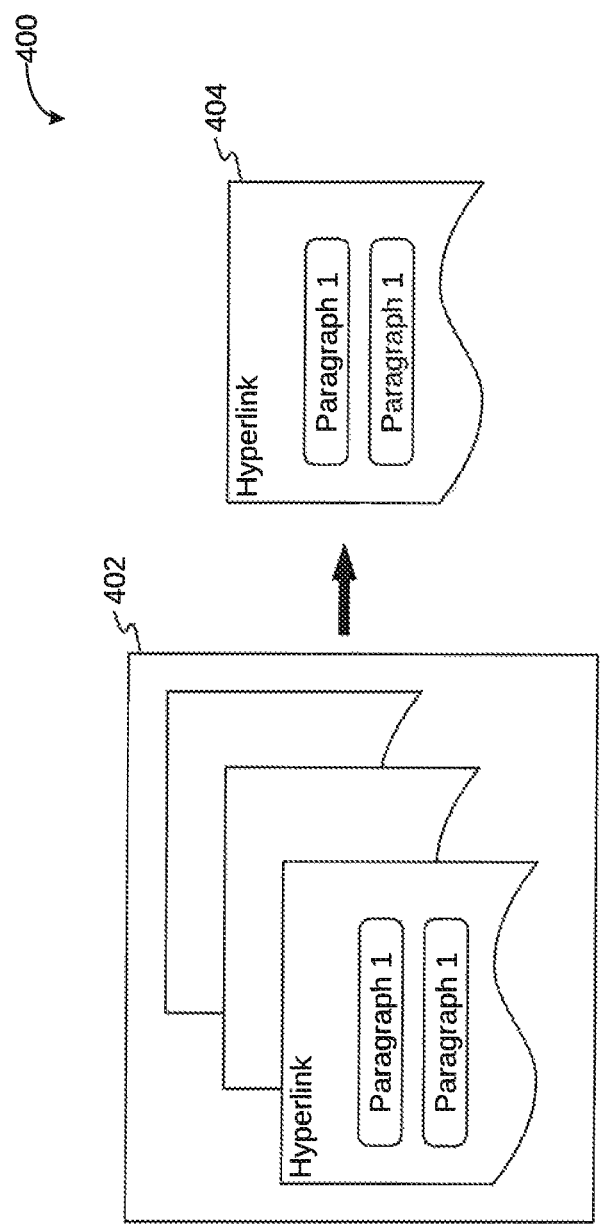
FIG. 4 illustrates an exemplary process of breaking down of video content into constituent one or more frames, consistent with the present disclosure.

The content creator UI 230 may further allow the video content to be broken into several frames for time stamping, as shown in FIG. 4. FIG. 4 show an exemplary process 400 of breaking down of video content 402 into constituent one or more frames 404. For example, each of the one or more frames 404 may include one or more text paragraphs. By way of an example, in the video content 402, one slide may stay for display spanning across multiple frames. Accordingly, only those frames which represent starting of a slide, can be time stamped. Further, there may be only a limited number of frames which may require updating, and only such frames may be tagged by marking timestamps.

Upon receiving the video content, the video frame and audio extraction module 202 may identify and extract one or more tagged frames, and audio content within the one or more tagged frames, from the video content. The audio content may include a lecture or an explanation of the slides within the one or more tagged frames. The video frame and audio extraction module 202 may further receive the audio sample. The video frame and audio extraction module 202 may then send the one or more tagged frames to the frame processing module 204, and the audio content and the audio sample to the audio processing module 206.

The frame processing module 204 may analyze the one or more tagged frames, to extract at least one of metadata, one or more hyperlinks and textual content within the one or more tagged frames. In some embodiments, the frame processing module 204 may include a text extraction module 226. In such embodiments, the text extraction module 226 may extract the metadata, the one or more hyperlinks associated with one or more source webpages, and the textual content, using Optical Character Recognition (OCR) technique. Further, the text extraction module 226 may, perform segmentation and classification over different entities, to extract hierarchical entity information of the image. It may be understood that the metadata may include one or more properties of the tagged frames. By way of an example, the one or more properties may include page layout information, a text border location, a text localization, an image localization, one or more paragraph coordinates, spatial configuration data of the textual and spatial entities along with word tokens, content alignment information, etc. The metadata may be used to find non-textual coordinates adjacent to the original textual content, to detect empty layout on which updated summarized content can be superimposed before reconstructing individual frames. By way of an example, the text localization may be based on a bounding frame like a word and a paragraph bounding box. After having been extracted, the metadata may be retained in the database 210. The metadata may be later used as textual content of the tagged video frames in the text classification module 214. In some embodiments, the tagged frames may include one or more presentation slides. Each of the one or more presentation slides may further include the one or more hyperlinks. by way of an example, the one or more hyperlinks may be included (positioned) at the start, or in-between, or at the end of each of the one or more presentation slides.

The audio processing module 206 may detect and extract speech patterns from the audio sample of the content creator. For example, the speech patterns may include a gender, a pitch, an intonation, an accent, etc. In some embodiments, the audio processing module 206 may extract the speech patterns using Artificial Neural Network (ANN). It may be noted that the ANN may be trained with a multiple number of human audio samples. Further, during training, the ANN may learn speech patterns unique to the content creator. Based on this training, the audio processing module 206 may generate and synthesize high fidelity audio waveform data, imitating the speech patterns of content creator from the multiple number of audio samples. In some embodiments, the audio processing module 206 may be scalable for creation of multiple audio personas, by way of parameterization of ANN. As it may be appreciated by those skilled in the art, the ANN may include NN weights that may be retained for future audio synthesis for different video contents of the content creator. The extracted speech pattern may be used as parameters by the TTS module 208.

The TTS module 208 may generate audio content of a summarized textual content, by using the speech pattern as parameters. The summarized textual content may be described further in conjunction with the text summarization module 218. As mentioned earlier, the speech pattern may include at least one of pitch, gender, or accent associated with a content creator. The speech pattern may help in mitigating an archaic robotic audio generation.

The web scraping module 212 may retrieve the one or more webpages using the one or more associated source hyperlinks. The web scraping module 212 may automatically retrieve the one or more webpages periodically, or according to a trigger initiated by the content creator. In some embodiments, the web scraping module 212 may retrieve the one or more webpages using web mining technique. For example, the web scraping module 212 may parse the one or more webpages to obtain textual contents. The obtained textual contents may be stored in a standard format, such as XML, JSON, or any other appropriate format, based on data requirement. The parsed webpage and the textual contents may then be sent to the text classification module 214.

The text classification module 214 may perform a textual similarity analysis. The textual similarity analysis may be performed between a first textual content and a plurality of text units within a second textual content. The first textual content may be derived from content information, and the second textual content may be derived from the one more webpages associated with the one or more source hyperlinks. The content information may include one or more of audio content within the tagged frame, speech pattern associated with the audio content, metadata associated with the frame, one or more source hyperlinks within the frame, and textual content within the frame. By way of an example, the textual content of the tagged frames may be obtained from the metadata stored in the database 210. An exemplary process of performing a textual similarity analysis by the text classification module 214 is shown in FIG. 5.

Figure 5:
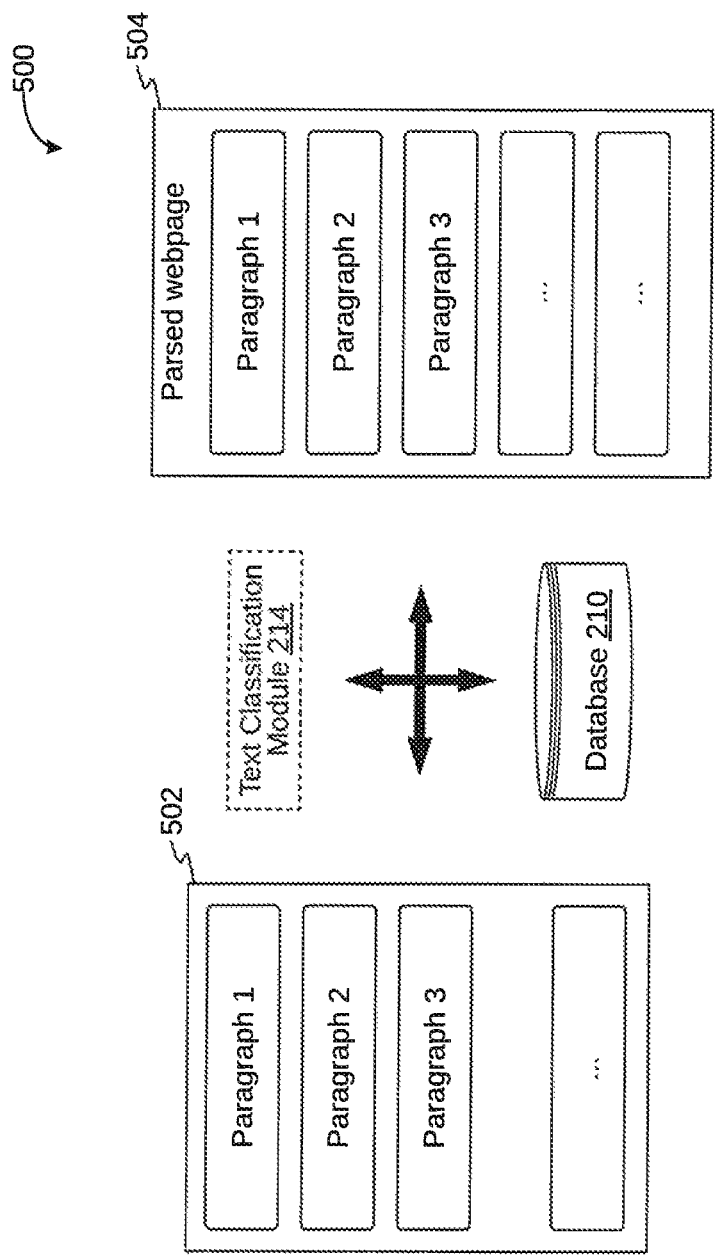
FIG. 5 illustrates an exemplary process of performing a textual similarity analysis, consistent with the present disclosure.

Referring now to FIG. 5, an exemplary process 500 of performing a textual similarity analysis is shown. A webpage 502 may be parsed to identify if there is any update in the content textual of the webpage 502. For example, Paragraph 3 of the parsed webpage 504 is an updated content. A text classification module 214 may perform the textual similarity analysis the first textual content within frame (derived from content information of the original/non-updated frame) and the second textual content (derived from the webpages associated with the one or more source hyperlinks). The textual content within the frame may be obtained from the metadata stored in a database 210.

Returning back to FIG. 2, in some embodiments the text classification module 214 may perform the textual similarity analysis based on an Artificial Neural Network (ANN), which may include pre-trained weights. Further, the ANN may be trained on text data, for learning common patterns between textual contents. These patterns may be stored as classifier weights in the ANN, and may be used for performing the textual similarity analysis. Further, the classifier weights may be stored in the database 210 for subsequent analysis. For example, the classifier weights may be used as prior knowledge for subsequent video content processing. In some scenarios, two video contents of similar topic may differ. It may be understood that these video contents may consume time to operate. For these type of video contents, the text classification module 214 (based on ANN) can boost performance of the automated content validation and updating process. It may be understood that a video content (for example, for a tutorial) may include compressed and summarized content. In some scenarios, the content creator may create the video content using bullet points. In such scenarios, the similarity analysis may be performed based on a simple token matching. However, such an analysis may affect the performance of the automated content validation and updating system. For example, the one or more webpages may not have same tokens that are used in the contents of the one or more tagged frames. In such scenarios, the ANN-based text classification module 214 may prove efficient for performing the similarity analysis.

In some embodiments, the text classification module 214 may further determine a similarity score for each of the plurality of text units, based on the textual similarity analysis between the first textual content and each of the plurality of text units within the second textual content. In some further embodiments, the similarity score determined for each of the plurality of text units may be compared with a first threshold score. Based on the comparing, a set of text units may be identified from the plurality of text units, when the similarity score for each of the text unit in the set of text units is greater than the first threshold score. For example, if the similarity score of a set of text from the source webpage is more than the pre-defined threshold, the content of the tagged frames may be mapped to that of the one or more webpages. Likewise, the similarity score identified for each of the text units in the set of text units may be compared with a second threshold score. Based on comparing, a subset of text units may be identified from the set of text units, when the similarity score for each of text unit in the subset is below the second threshold score. The similarity scores may then be sent to the similarity checking module 216.

The similarity checking module 216 may sort and store a list of text units from the one or more webpages, using the determined similarity scores. By way of an example, high similarity score of text units may indicate that these text units are not new or updated. Likewise, low similarity score of text units may indicate that these text units are new and updated. The text units with the low similarity score may be stored separately for further processing.

The text summarization module 218 may generate a summarized text from the subset of text units (i.e. the text units which are new and updated). In other words, the text summarization module 218 may generate the summarized text using the text units in the subset having similarly score below the second threshold score. In some embodiments, the text summarization module 218 may generate the summarized text by using ANN. For example, using the ANN, paragraphs belonging to the summarized text may be compressed into bullet points. In some further embodiments, the text summarization module 218 may assign ANN weights for validating the summarized text. The text summarization module 218 may the send the generated summarized text to the TTS module 208.

The TTS module 208 may be fine-tuned and parameterized, based on learned features or parameters from the audio processing module 206, to provide high fidelity audio samples which are similar to audio samples of the content creator. The TTS module 208 may further use the summarized text as input, to generate audio waveform samples as output for the summarized text, using the speech pattern identified from the audio sample of the content creator.

The content layout generating module 220 may generate an empty content layout, based on the metadata associated with the frame. The metadata may include various properties, such as page layout information, text border location, text localization, image localization, paragraph coordinates. Further, these various properties may be obtained using the OCR technique. Once the empty content layout is generated, the content layout generating module 220 may populate the empty content layout with the summarized text. For example, the summarized text may be filled in the empty content layout, and superimposed to corresponding tagged frame. It may be noted that filling the summarized text to the empty content layout and superimposing to the corresponding tagged frames may be achieved in a frame-by-frame manner. The location for adding the summarized text in the tagged frame may be localized, based on empty layout coordinates. The tagged frames with the summarized text may be sent to the image and video processing module 222.

The image and video processing module 222 may recreate a video of the tagged frames with the summarized text. It may be understood that the video may be recreated in a similar fashion as of the original video uploaded by the content creator. The video may be recreated by using markers, such as the slide change time stamp markers. The recreated video may be sent to the merging module 224. The merging module 224 may merge the audio contents of the uploaded video and the summarized text, to obtain an updated audio content. The updated audio content may be merged with the recreated video to generate an updated video content. The updated video content may be stored in the database 210. Once the updated video content is ready, a user may use a user User-Interface (UI) 232 to access one or more options. Using these options, the user may select to view the obsolete (older) video content and the updated video content. The uploaded (original) video may be accessible to the users even when the original uploaded video is undergoing an update process.

The video cache 228 may store the uploaded video content that may allow the user to access it even when the update process is undergoing at backend. While the update of the tutorial content remains in progress, a cached copy of the tutorial content is used to serve the users of the online video content platform. It may be noted that the video content may be updated based on an automated information retrieval technique in the back end.

Figure 3:
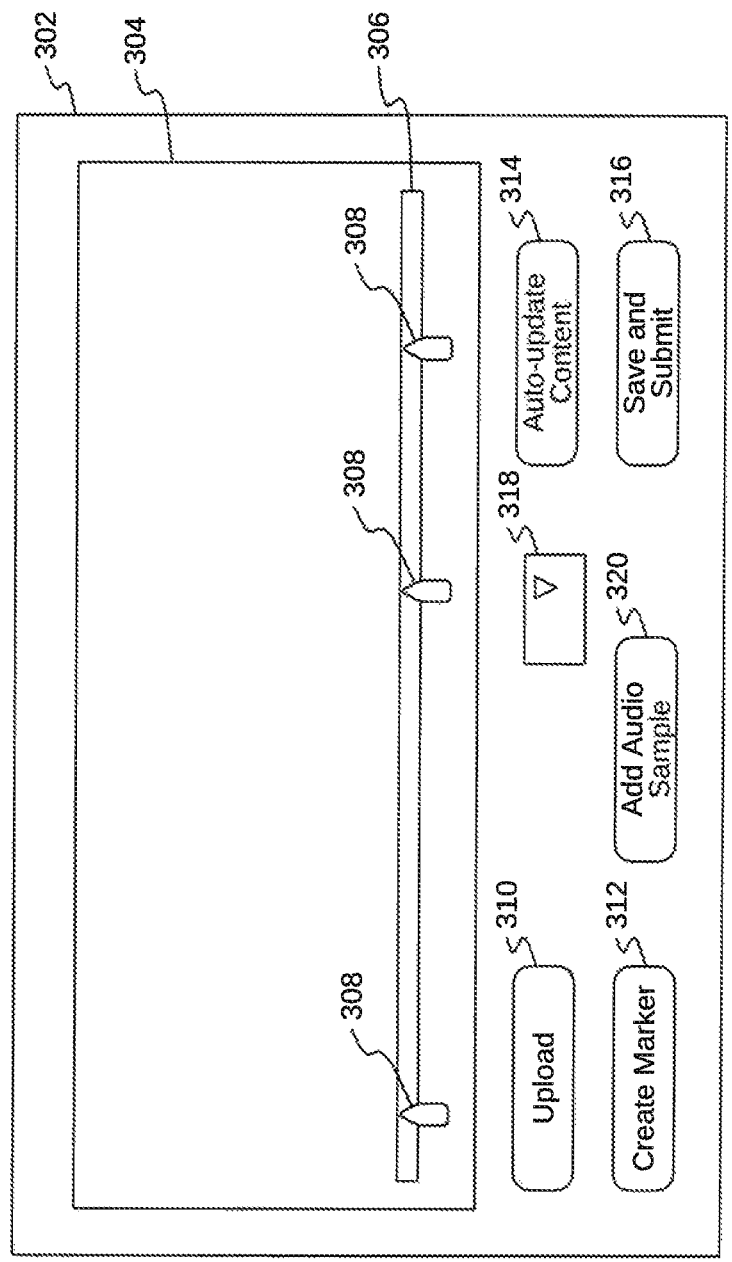
FIG. 3 illustrates an exemplary content creator User Interface, consistent with the present disclosure

Referring now to FIG. 3, an exemplary content creator UI 300 (analogous to content creator UI 230) is illustrated, in accordance with an embodiment. The content creator UI 300 may include a user interface (UI) 302. The UI 302 may allow for uploading a video content, and may further allow for tagging the video content. The content creator UI 300 may include a window 304 where the uploaded video content may be broken down into frames and displayed in a frame-by-frame manner. The content creator UI 300 may further include a video frame navigation bar 306 for navigating through the video frames. The video frame navigation bar 306 may provide for tagging a slide change time stamp. The content creator UI 300 may further include one or more slide change timestamp markers 308, which may allow the content creator to mark an approximate position at which slide change has occurred on the video frame navigation bar 306. It may be understood that the timestamp markers 308 may be used for feature extraction and text parsing. The content creator UI 300 may further include various buttons, such as a video upload button 310, a create marker button 312, an auto-update content button 314, a save and submit button 316, a drop-down list button 318 and add an audio sample button 320.

The video upload button 310 may be used for uploading the video content. The create marker button 312 may create a marker approximately at the center of the video frame navigation bar 306. The create marker button 312 can be dragged and positioned to mark slide change. The auto-update content button 314 may provide one or more options, such as whether to allow content validation and update process on uploaded content, or not update the content. The save and submit button 316 may be clicked to upload the tagged video frames to the automated content validation and updating system and exit the process. The drop-down list button 318 may provide various options, such as for how frequently the auto-update process has to run for the video content. The add audio sample button 320 may be used for adding an audio sample of the content creator, by clicking on the add audio sample button 320.

Figure 6:
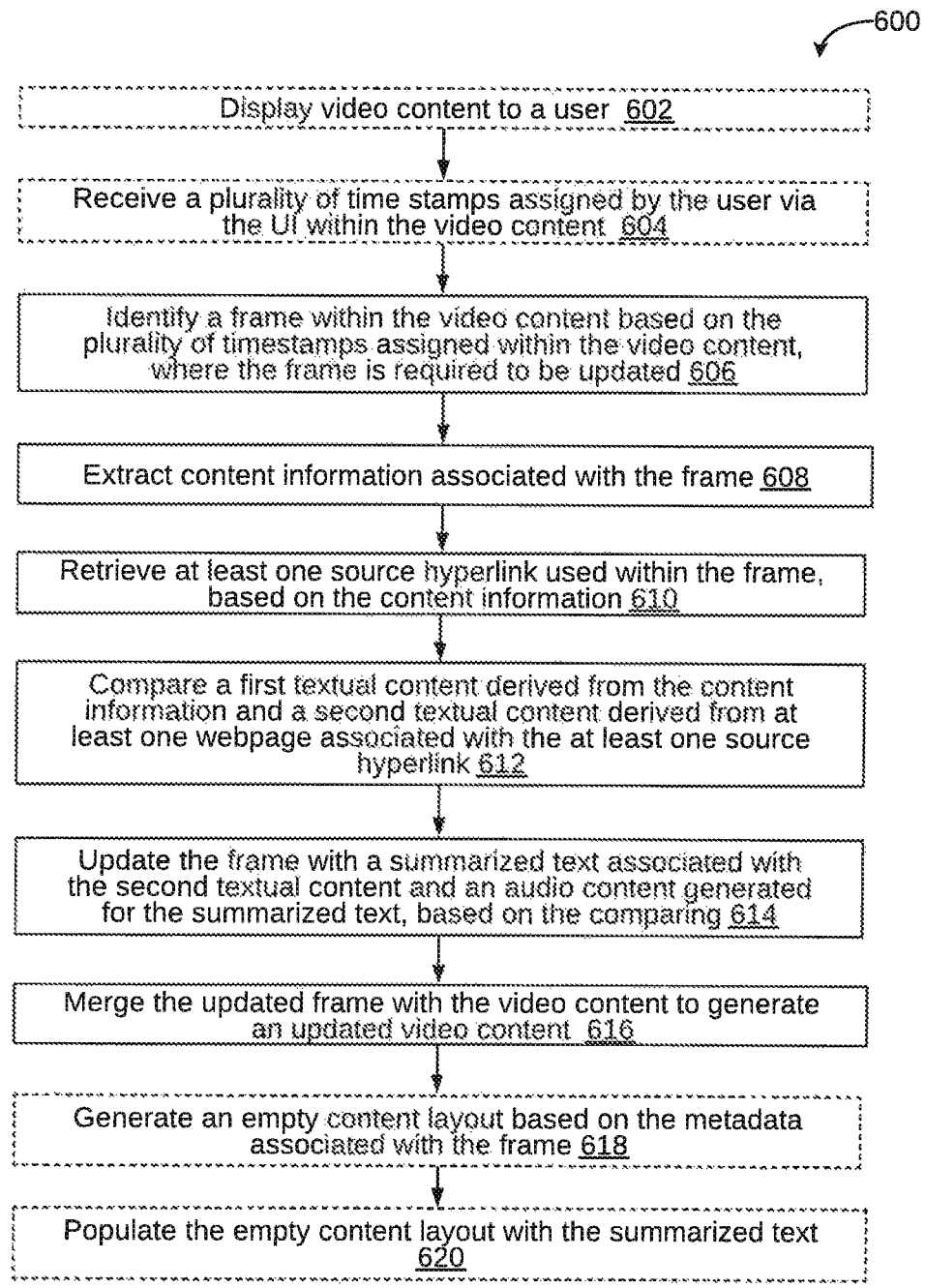
FIG. 6 illustrates a flowchart of a method for automatically updating video content, consistent with the present disclosure.

Referring now to FIG. 6, a flowchart 600 of a method for automatically updating video content is illustrated, in accordance with an embodiment. In some embodiments, the video content may relate to online tutorials. At step 606, a frame may be identified within a video content based on a plurality of timestamps assigned within the video content, wherein the frame is required to be updated. At step 608, content information associated with the frame may be extracted. At step 610, at least one source hyperlink used within the frame may be retrieved, based on the content information. At step 612, a first textual content derived from the content information and a second textual content derived from at least one webpage associated with the at least one source hyperlink may be compared. It may be noted that the first textual content and the second textual content may be compared in order to determine if the video content requires an update or not. For example, an automated information retrieval technique may be used that may source textual content from a webpage, and compare the textual content from the webpages with existing tutorial content, and update the existing tutorial content based on any updates in the source textual content from the webpage. At step 614, the frame may be updated with a summarized text associated with the second textual content and an audio content generated for the summarized text, based on the comparing. At step 616, the updated frame may be merged with the video content to generate an updated video content. Additionally, at step 602, the video content may be displayed to a user. At step 604, a plurality of time stamps assigned by the user via the UI within the video content may be received. Further, at step 618, an empty content layout may be generated based on the metadata associated with the frame. At step 620, the empty content layout may be populated with the summarized text.

At step 602, the video content may be displayed to a user. The video content may be displayed via a user User-Interface (Up 232. In some embodiments, at step 604, a plurality of timestamps assigned by the user within the video content may be received. The plurality of timestamps may be assigned by the user via a content creator user interface (UI) 230. It may be noted that the video content may include a plurality of frames tagged with timestamps based on textual content in the video content. At step 606, a frame requiring an update may be identified within a video content, based on a plurality of timestamps assigned within the video content.

At step 608, content information associated with the identified frame may be extracted. The content information may include at least one of audio content within the frame, speech pattern associated with the audio content, metadata associated with the frame, hyperlinks within the frame, and textual content within the frame. The audio content may further include an audio sample of the content creator. It may be noted that the speech pattern of the content creator may be obtained from the audio sample, which may be used for providing explanation for updated frames. At step 610, at least one source hyperlink used within the frame may be retrieved, based on the content information. As mentioned earlier, the content information may include the hyperlinks within the frame. In some embodiments, the at least one source hyperlink may be retrieved from within the frame, using Optical Character Recognition (OCR) technique.

At step 612, a first textual content may be derived from the content information within the frame. Further, at step 612, a second textual content may be derived from at least one webpage associated with the at least one source hyperlink. Upon deriving the first textual content and the second textual content, the first textual content and the second textual content may be compared. In some embodiments, in order to compare the first textual content and the second textual content, a textual similarity analysis may be performed between the first textual content and a plurality of text units within the second textual content. It may be understood that the textual similarity analysis may determine if the textual content of the tagged video frames and the source webpage are related. In some embodiments the textual similarity analysis may be performed based on an Artificial Neural Network (ANN). Further, a similarity score for each of the plurality of text units may be determined, based on the textual similarity analysis between the first textual content and each of the plurality of text units within the second textual content. Further, at step 612, the similarity score determined for each of the plurality of text units may be compared with a first threshold score. Based on the comparing, a set of text units may be identified from the plurality of text units, when the similarity score for each of the text unit in the set of text units is greater than the first threshold score. It may be understood that if the similarity score is more than the first threshold, the frame and the webpage are related. Accordingly, the first textual content of the frame may be mapped to the second textual content of the webpage. Additionally, at step 612, the similarity score identified for each of the text unit in the set of text units may be compared with a second threshold score. Based on the comparing, a subset of text units from the set of text units may be identified, when the similarity score for each of text unit in the subset is below the second threshold score.

At step 614, the frame may be updated with a summarized text associated with the second textual content and an audio content generated for the summarized text, based on the comparing performed at step 612. In some embodiments, the summarized text may be generated from the subset of text units. Further, in some embodiments, the summarized text may be generated using Artificial Neural Network (ANN). At step 616, the updated frame may be merged with the video content to generate an updated video content. In some embodiments, audio waveform samples may be generated based on the summarized text. For example, the audio waveform samples may be generated as output based on the input summarized text, using the speech pattern identified from the audio sample of the content creator.

At step 618, an empty content layout may be generated based on the metadata associated with the frame. It may be noted that the metadata may include various properties, such as page layout information, text border location, text localization, image localization, paragraph coordinates. Upon generating the empty content layout, at step 620, the empty content layout may be populated with the summarized text. By way of an example, the summarized text may be filled in the empty content layout, and superimposed to corresponding frame. Further, the audio content may be merged with audio content of the frames for obtaining an updated audio content. Thereafter, the updated textual content with the updated audio content may be merged with the uploaded video content for obtaining an updated video content. In some embodiments, options may be provided to a user, via the user UI 232 for selecting the updated video or the uploaded video content. In further embodiments, original uploaded video content may be made be available for user consumption along with the updated video content. It may be understood that each iteration of updating may generate an updated version of the original video content, and different versions of updated video content may be made available to user through the user UI 232.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 7:
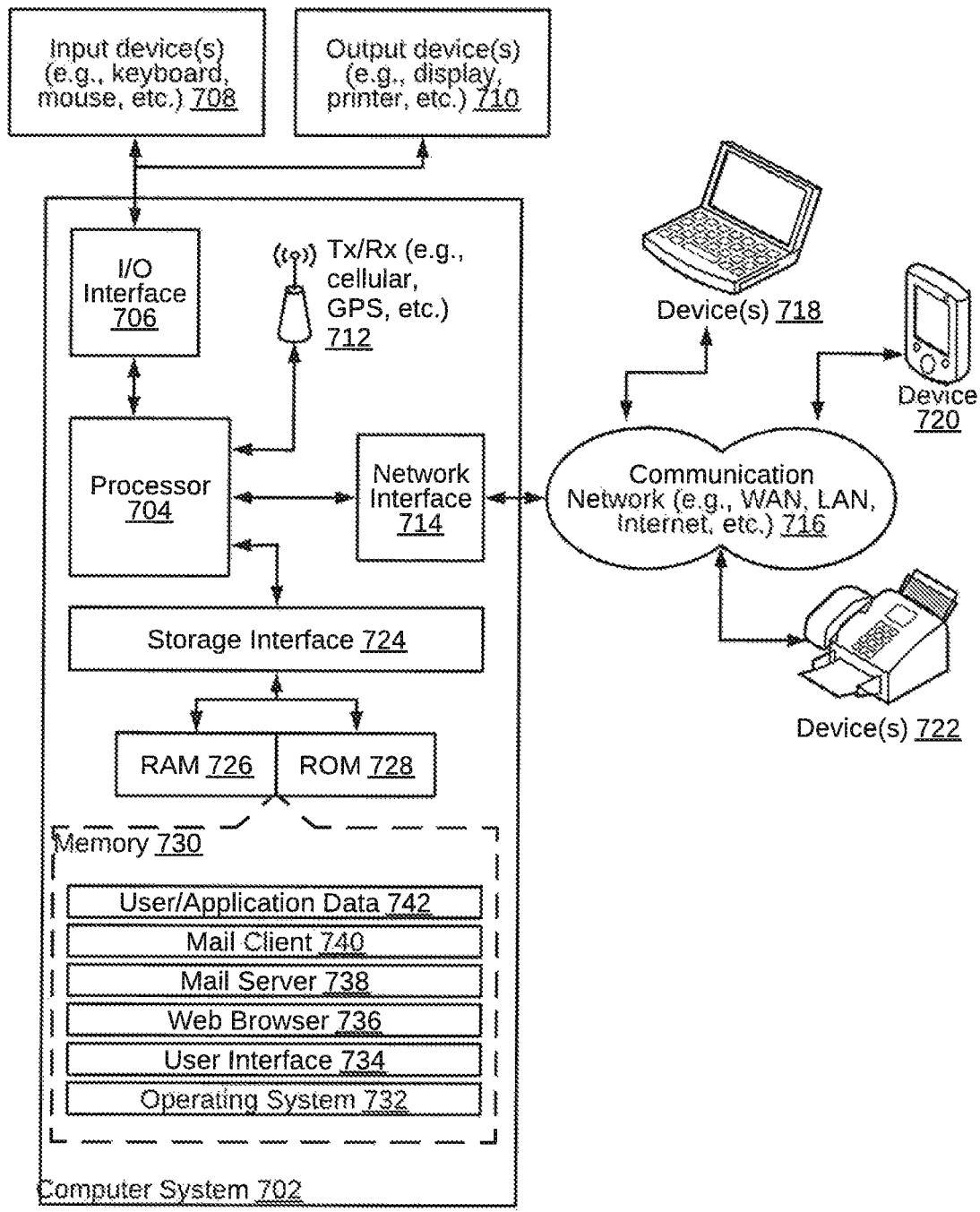
FIG. 7 illustrates a block diagram of an exemplary computer system for implementing embodiments, consistent with the present disclosure.

The disclosed methods and systems may be implemented on a conventional or a general-purpose computer system, such as a personal computer (PC) or server computer. Referring now to FIG. 7, a block diagram of an exemplary computer system 702 for implementing various embodiments is illustrated. Computer system 702 may include a central processing unit ("CPU" or "processor") 704. Processor 704 may include at least one data processor for executing program components for executing user or system-generated requests. A user may include a person, a person using a device such as such as those included in this disclosure, or such a device itself. Processor 704 may include specialized processing units such as integrated system (bus) controllers, memory management control units, floating point units, graphics processing units, digital signal processing units, etc. Processor 704 may include a microprocessor, such as AMD® ATHLON® microprocessor, DURON® microprocessor OR OPTERON® microprocessor, ARM's application, embedded or secure processors, IBM® POWERPC®, INTEL'S CORE® processor, ITANIUM® processor, XEON® processor, CELERON® processor or other line of processors, etc. Processor 704 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 704 may be disposed in communication with one or more input/output (I/O) devices via an I/O interface 706. I/O interface 706 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (for example, code-division multiple access (CDMA), high-speed packet access (HSPA+), global system for mobile communications (GSM), long-term evolution (LTE), WiMax, or the like), etc.

Using I/O interface 706, computer system 702 may communicate with one or more I/O devices. For example, an input device 708 may be an antenna, keyboard, mouse, joystick, (infrared) remote control, camera, card reader, fax machine, dongle, biometric reader, microphone, touch screen, touchpad, trackball, sensor (for example, accelerometer, light sensor, GPS, gyroscope, proximity sensor, or the like), stylus, scanner, storage device, transceiver, video device/source, visors, etc. An output device 710 may be a printer, fax machine, video display (for example, cathode ray tube (CRT), liquid crystal display (LCD), light-emitting diode (LED), plasma, or the like), audio speaker, etc. In some embodiments, a transceiver 712 may be disposed in connection with processor 704. Transceiver 712 may facilitate various types of wireless transmission or reception. For example, transceiver 712 may include an antenna operatively connected to a transceiver chip (for example, TEXAS® INSTRUMENTS WILINK WL1286® transceiver, BROADCOM® BCM4550IUB8® transceiver, INFINEON TECHNOLOGIES® X-GOLD 618-PMB9800® transceiver, or the like), providing IEEE 802.6a/b/g/n, Bluetooth, FM, global positioning system (GPS), 2G/3G HSDPA/HSUPA communications, etc.

In some embodiments, processor 704 may be disposed in communication with a communication network 714 via a network interface 716. Network interface 716 may communicate with communication network 714. Network interface 716 may employ connection protocols including, without limitation, direct connect, Ethernet (for example, twisted pair 50/500/5000 Base T), transmission control protocol/internet protocol (TCP/IP), token ring, IEEE 802.11a/b/g/n/x, etc. Communication network 714 may include, without limitation, a direct interconnection, local area network (LAN), wide area network (WAN), wireless network (for example, using Wireless Application Protocol), the Internet, etc. Using network interface 716 and communication network 714, computer system 702 may communicate with devices 718, 720, and 722. These devices may include, without limitation, personal computer(s), server(s), fax machines, printers, scanners, various mobile devices such as cellular telephones, smartphones (for example, APPLE® IPHONE® smartphone, BLACKBERRY® smartphone, ANDROID® based phones, etc.), tablet computers, eBook readers (AMAZON® KINDLE® ereader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, computer system 702 may itself embody one or more of these devices.

In some embodiments, processor 704 may be disposed in communication with one or more memory devices (for example, RAM 726, ROM 728, etc.) via a storage interface 724. Storage interface 724 may connect to memory 730 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 730 may store a collection of program or database components, including, without limitation, an operating system 732, user interface application 734, web browser 736, mail server 738, mail client 740, user/application data 742 (for example, any data variables or data records discussed in this disclosure), etc. Operating system 732 may facilitate resource management and operation of computer system 702. Examples of operating systems 732 include, without limitation, APPLE® MACINTOSH® OS X platform, UNIX platform, Unix-like system distributions (for example, Berkeley Software Distribution (BSD), FreeBSD, NetBSD, OpenBSD, etc.), LINUX distributions (for example, RED HAT®, UBUNTU®, KUBUNTU®, etc.), IBM® OS/2 platform, MICROSOFT® WINDOWS® platform (XP, Vista/7/8, etc.), APPLE® IOS® platform, GOOGLE® ANDROID® platform, BLACKBERRY® OS platform, or the like. User interface 734 may facilitate display, execution, interaction, manipulation, or operation of program components through textual or graphical facilities. For example, user interfaces may provide computer interaction interface elements on a display system operatively connected to computer system 702, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT® WINDOWS® platform (for example, AERO® platform, METRO® platform, etc.), UNIX X-WINDOWS, web interface libraries (for example, ACTIVEX® platform, JAVA® programming language, JAVASCRIPT® programming language, AJAX® programming language, HTML, ADOBE® FLASH® platform, etc.), or the like.

In some embodiments, computer system 702 may implement a web browser 736 stored program component. Web browser 736 may be a hypertext viewing application, such as MICROSOFT® INTERNET EXPLORER® web browser, GOOGLE® CHROME® web browser, MOZILLA® FIREFOX® web browser, APPLE® SAFARI® web browser, etc. Secure web browsing may be provided using HTTPS (secure hypertext transport protocol), secure sockets layer (SSL), Transport Layer Security (TLS), etc. Web browsers may utilize facilities such as AJAX, DHTML, ADOBE® FLASH® platform, JAVASCRIPT® programming language, JAVA® programming language, application programming interfaces (APis), etc. In some embodiments, computer system 702 may implement a mail server 738 stored program component. Mail server 738 may be an Internet mail server such as MICROSOFT® EXCHANGE® mail server, or the like. Mail server 738 may utilize facilities such as ASP, ActiveX, ANSI C++/C#, MICROSOFT.NET® programming language, CGI scripts, JAVA® programming language, JAVASCRIPT® programming language, PERL® programming language, PHP® programming language, PYTHON® programming language, WebObjects, etc. Mail server 738 may utilize communication protocols such as internet message access protocol (IMAP), messaging application programming interface (MAPI), Microsoft Exchange, post office protocol (POP), simple mail transfer protocol (SMTP), or the like. In some embodiments, computer system 702 may implement a mail client 740 stored program component. Mail client 740 may be a mail viewing application, such as APPLE MAIL® mail client, MICROSOFT ENTOURAGE® mail client, MICROSOFT OUTLOOK® mail client, MOZILLA THUNDERBIRD® mail client, etc.

In some embodiments, computer system 702 may store user/application data 742, such as the data, variables, records, etc. as described in this disclosure. Such databases may be implemented as fault-tolerant, relational, scalable, secure databases such as ORACLE® database OR SYBASE® database. Alternatively, such databases may be implemented using standardized data structures, such as an array, hash, linked list, struct, structured text file (for example, XML), table, or as object-oriented databases (for example, using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

As will be appreciated by those skilled in the art, the techniques described in the various embodiments discussed above pertain to automatically updating video content, such as online tutorial video content. The techniques provide for identifying frames within the video content which may require an update, based on a plurality of timestamps assigned within the video content. The techniques further provide for extracting content information associated with the frame and retrieving source hyperlink used within the frame using OCR and ANN based techniques. The techniques further provide for comparing textual content derived from content information and textual content derived from webpages associated with the source hyperlink based on similarity score to determine if the frame needs an update or not. The techniques further provide for updating the frame with a summarized text, and merging the updated frame with the video content to generate an updated video content.

The above techniques, therefore, provide for an automatic process of updating video content, by automatically determining if a frame of the video content requires an update. By making the updating process automatic, the techniques provide for an easy to use and time efficient way of updating the video content. Furthermore, the techniques eliminate the downtime (time period during which the video content is being updated), by making the uploaded video content available to users, even during the downtime. As a result, the inconvenience to the users, such as when the users are in the middle of accessing the video content is avoided. Further, by using machine learning, for example, artificial neural network (ANN), the techniques provide for a robust and self-improving solution. Moreover, the techniques are independent of content data bias i.e. not restricted to the textual content of the video, and therefore, are scalable.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for automatically updating video content, the method comprising:
   identifying, by an updating device, a frame within a video content based on a plurality of timestamps assigned within the video content, wherein the frame is required to be updated;
   extracting, by the updating device, content information associated with the frame;
   retrieving, by the updating device, at least one source hyperlink used within the frame, based on the content information;
   comparing, by the updating device, a first textual content derived from the content information and a second textual content derived from at least one webpage associated with the at least one source hyperlink, wherein the comparing comprises:
      comparing a first similarity score, determined for each of a plurality of text units within the second textual content, with a first threshold score, wherein the first similarity score indicates closeness between the first textual content and each of the plurality of text units;
      comparing a second similarity score, determined for each of a set of text units from the plurality of text units, with a second threshold score, wherein the second similarity score indicates closeness between the first textual content and each of the set of text units, wherein the set of text units indicate text units with the first similarity score greater than the first threshold score; and
      identifying a subset of text units from the set of text units, wherein the subset of text units indicate text units with the second similarity score less than the second threshold score;
   updating, by the updating device, the frame with a summarized text associated with the second textual content and an audio content generated for the summarized text, based on the comparing, wherein updating comprises generating the summarized text from the subset of text units; and
   merging, by the updating device, the updated frame with the video content to generate an updated video content.

2. The method of claim 1, further comprising:
   displaying, via a User Interface (UI), at least one of the video content and the updated video content to a user; and
   receiving the plurality of timestamps assigned by the user via the UI within the video content.

3. The method of claim 1, wherein the content information comprises at least one of audio content within the frame, speech pattern associated with the audio content, metadata associated with the frame, hyperlinks within the frame, or textual content within the frame.

4. The method of claim 3, wherein each of the metadata, the hyperlinks, and the textual content is extracted using Optical Character Recognition (OCR) technique.

5. The method of claim 3, further comprising generating an empty content layout based on the metadata associated with the frame, wherein the metadata comprises at least one of page layout information, text border location, text localization, image localization, or paragraph coordinates.

6. The method of claim 5 further comprising populating the empty content layout with the summarized text.

7. The method of claim 1, wherein the comparing further comprises:
   performing textual similarity analysis between the first textual content and the plurality of text units within the second textual content; and
   determining the first similarity score for each of the plurality of text units, based on the textual similarity analysis between the first textual content and each of the plurality of text units within the second textual content.

8. The method of claim 7, further comprising
   identifying a set of text units from the plurality of text units based on the comparing.

9. The method of claim 1, wherein the audio content is generated using a speech pattern associated with audio content derived from the content information, and wherein the speech pattern comprises at least one of pitch, gender, or accent associated with a content creator.

10. An updating device for automatically updating video content, the updating device comprising:
- a processor; and
- a memory communicatively coupled to the processor, wherein the memory stores processor instructions, which, on execution, causes the processor to:
  - identify a frame within a video content based on a plurality of timestamps assigned within the video content, wherein the frame is required to be updated;
  - extract content information associated with the frame;
  - retrieve at least one source hyperlink used within the frame, based on the content information;
  - compare a first textual content derived from the content information and a second textual content derived from at least one webpage associated with the at least one source hyperlink, wherein the comparing comprises:
    - comparing a first similarity score, determined for each of a plurality of text units within the second textual content, with a first threshold score, wherein the first similarity score indicates closeness between the first textual content and each of the plurality of text units;
    - comparing a second similarity score, determined for each of a set of text units from the plurality of text units, with a second threshold score, wherein the second similarity score indicates closeness between the first textual content and each of the set of text units, wherein the set of text units indicate text units with the first similarity score greater than the first threshold score; and
    - identifying a subset of text units from the set of text units, wherein the subset of text units indicate text units with the second similarity score less than the second threshold score;
  - update the frame with a summarized text associated with the second textual content and an audio content generated for the summarized text, based on the comparing, wherein updating comprises generating the summarized text from the subset of text units; and
  - merge the updated frame with the video content to generate an updated video content.

11. The updating device of claim 10, wherein the processor instructions further cause the processor to:
- display, via a User Interface (UI), at least one of the video content and the updated video content to a user; and
- receive the plurality of timestamps assigned by the user via the UI within the video content.

12. The updating device of claim 10, wherein the content information comprises at least one of audio content within the frame, speech pattern associated with the audio content, metadata associated with the frame, hyperlinks within the frame, or textual content within the frame, and wherein each of the metadata, the hyperlinks, and the textual content is extracted using Optical Character Recognition (OCR) technique.

13. The updating device of claim 12, wherein the processor instructions further cause the processor to:
- generate an empty content layout based on the metadata associated with the frame, wherein the metadata comprises at least one of page layout information, text border location, text localization, image localization, or paragraph coordinates; and
- populate the empty content layout with the summarized text.

14. The updating device of claim 10, wherein the comparing comprises:
- performing textual similarity analysis between the first textual content and the plurality of text units within the second textual content; and
- determining the first similarity score for each of the plurality of text units, based on the textual similarity analysis between the first textual content and each of the plurality of text units within the second textual content.

15. The updating device of claim 14, wherein the processor instructions further cause the processor to:
- identify a set of text units from the plurality of text units based on the comparing.

16. The updating device of claim 10, wherein the audio content is generated using a speech pattern associated with audio content derived from the content information, and wherein the speech pattern comprises at least one of pitch, gender, or accent associated with a content creator.

17. A non-transitory computer-readable storage medium having stored thereon, a set of computer-executable instructions causing a computer comprising one or more processors to perform steps comprising:
- identifying a frame within a video content based on a plurality of timestamps assigned within the video content, wherein the frame is required to be updated;
- extracting content information associated with the frame;
- retrieving at least one source hyperlink used within the frame, based on the content information;
- comparing a first textual content derived from the content information and a second textual content derived from at least one webpage associated with the at least one source hyperlink, wherein the comparing comprises:
  - comparing a first similarity score, determined for each of a plurality of text units within the second textual content, with a first threshold score, wherein the first similarity score indicates closeness between the first textual content and each of the plurality of text units;
  - comparing a second similarity score, determined for each of a set of text units from the plurality of text units, with a second threshold score, wherein the second similarity score indicates closeness between the first textual content and each of the set of text units, wherein the set of text units indicate text units with the first similarity score greater than the first threshold score; and
  - identifying a subset of text units from the set of text units, wherein the subset of text units indicate text units with the second similarity score less than the second threshold score;
- updating the frame with a summarized text associated with the second textual content and an audio content generated for the summarized text, based on the comparing, wherein updating comprises generating the summarized text from the subset of text units; and
- merging the updated frame with the video content to generate an updated video content.

* * * * *